US012261010B2

(12) United States Patent
Jepsen et al.

(10) Patent No.: US 12,261,010 B2
(45) Date of Patent: Mar. 25, 2025

(54) PHOTO-CATHODE FOR A VACUUM SYSTEM

(71) Applicant: HAMAMATSU PHOTONICS K.K., Hamamatsu (JP)

(72) Inventors: Peter Uhd Jepsen, Copenhagen (DK); Simon Lehnskov Lange, Copenhagen (DK); Motohiro Suyama, Hamamatsu (JP); Masahiko Iguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 431 days.

(21) Appl. No.: 17/619,711

(22) PCT Filed: Jun. 19, 2020

(86) PCT No.: PCT/JP2020/024161
§ 371 (c)(1),
(2) Date: Dec. 16, 2021

(87) PCT Pub. No.: WO2020/262239
PCT Pub. Date: Dec. 30, 2020

(65) Prior Publication Data

US 2022/0310349 A1 Sep. 29, 2022

(30) Foreign Application Priority Data

Jun. 26, 2019 (EP) .................................... 19182534

(51) Int. Cl.
*H01J 1/34* (2006.01)
*H01J 31/50* (2006.01)
(Continued)

(52) U.S. Cl.
CPC .............. *H01J 1/34* (2013.01); *H01J 31/507* (2013.01); *H01J 40/06* (2013.01); *H01J 43/246* (2013.01); *H01J 2201/3425* (2013.01)

(58) Field of Classification Search
CPC ............................ H01J 1/34; H01J 2201/3425
See application file for complete search history.

(56) References Cited

U.S. PATENT DOCUMENTS 4,591,717 A 5/1986 Scherber
2007/0057211 A1 3/2007 Bahlman et al.
(Continued)

FOREIGN PATENT DOCUMENTS

CN 101572201 A 11/2009
CN 103081126 A 5/2013
(Continued)

OTHER PUBLICATIONS

Ashihara, Satoshi, "Mid-infrared plasmonic field enhancement and its application to novel nonlinear optical phenomena," Kakenhi/ Grants-in-Aid for Scientific Research Research Report, Jun. 8, 2016.
(Continued)

*Primary Examiner* — Mariceli Santiago
(74) *Attorney, Agent, or Firm* — Faegre Drinker Biddle & Reath LLP

(57) ABSTRACT

This invention concerns a photo-cathode for a vacuum system, wherein the photo-cathode is configured for receiving electromagnetic radiation having an incoming wavelength and for emitting electrons in response thereto. The photo-cathode comprises a conducting structure having a geometry, the geometry comprising a tip section. The tip section is adapted to provide field enhancement, β, when the conducting structure is illuminated with the electromagnetic radiation, wherein β is greater than about $10^2$. The photo-
(Continued)

cathode further comprising a substrate, the substrate being or comprising a dielectric substrate, the substrate supporting the conducting structure.

18 Claims, 16 Drawing Sheets

(51) Int. Cl.
*H01J 40/06* (2006.01)
*H01J 43/24* (2006.01)

(56) References Cited

U.S. PATENT DOCUMENTS

| | | | | |
|---|---|---|---|---|
| 2007/0228355 | A1 | 10/2007 | Singh | |
| 2011/0220172 | A1 | 9/2011 | Layton | |
| 2016/0216201 | A1 | 7/2016 | Iwaszczuk et al. | |
| 2016/0343532 | A1 | 11/2016 | Chuang et al. | |
| 2019/0108963 | A1 * | 4/2019 | Hill | H01J 40/06 |

FOREIGN PATENT DOCUMENTS

| | | | |
|---|---|---|---|
| CN | 107210185 | A | 9/2017 |
| CN | 107667410 | A | 2/2018 |
| JP | H3-102226 | A | 4/1991 |
| JP | 2001-526446 | A | 12/2001 |
| JP | 2006-074021 | A | 3/2006 |
| JP | 2007-184559 | A | 7/2007 |
| JP | 2013-522821 | A | 6/2013 |
| JP | 2018-521457 | A | 8/2018 |
| WO | WO-99/030348 | A1 | 6/1999 |
| WO | WO-2011/112086 | A1 | 9/2011 |
| WO | WO-2015/028029 | A1 | 3/2015 |
| WO | WO-2016/187603 | A1 | 11/2016 |

OTHER PUBLICATIONS

Written Opinion Of the International Searching Authority mailed Sep. 9, 2020 for PCT/JP2020/024161.

Electrical Society East China Branch, National Yunnan Xiangyang Machinery Factory, "Vacuum Circuit Breaker and Switch", Dec. 31, 1976, p. 24, with English translation.

* cited by examiner

PHOTO-CATHODE FOR A VACUUM SYSTEM

TECHNICAL FIELD

The present invention relates to a photo-cathode for a vacuum system.

BACKGROUND ART

Vacuum systems, such as photomultiplier tubes (PMT) or multi-channel plates are well-known for realizing detectors for light in the visible and ultra-violet (UV) range.

CITATION LIST

Patent Literature

Patent Literature 1: WO Unexamined Patent Application Publication No. 2015/028029

SUMMARY OF INVENTION

Technical Problem

Photomultiplier tubes are used for sensitive detection of very small amounts of light, even down to the single-photon limit, and are therefore attractive for low-light applications. However, their appealing properties are only useful in a spectral range from red light and into the UV.

Patent Literature 1 discloses a device for detecting terahertz radiation, based on the principle that a strong THz pulse can generate ultrafast field emission of electrons from a surface of a metallic layer via nonperturbative nonlinear interactions. The electrons may be accelerated to multi-10-eV kinetic energies by the same enhanced THz field near the metal, and can be used to initiate collision-induced physical processes on an ultrafast time scale, such as formation of a nitrogen plasma.

Hence, an improved photo-cathode would be advantageous, and in particular a photo-cathode being sensitive to a broader wavelength range would be advantageous.

An object of the present invention is to provide an alternative to the prior art.

In particular, it may be seen as a further object of the present invention to provide a photo-cathode for a vacuum system that solves the above mentioned problems of the prior art with a limited wavelength range of operation.

Solution to Problem

Thus, the above-described object and several other objects are intended to be obtained in a first aspect of the invention by providing a photo-cathode for a vacuum system, wherein the photo-cathode is configured for receiving electromagnetic radiation having an incoming wavelength and for emitting electrons in response thereto. The photo-cathode comprises a conducting structure having a geometry, the geometry comprising a tip section. The tip section is adapted to provide field enhancement, β, when the conducting structure is illuminated with the electromagnetic radiation, wherein β is greater than about $10^2$. The photo-cathode further comprising a substrate, the substrate being or comprising a dielectric substrate, the substrate supporting the conducting structure. A photo-cathode formed in this way enables an efficient field emission, by using the electric field carried by photons in the THz- and infrared frequency range. By constructing the conducting structures, also called "antennas" in the following, to provide a sufficiently high field enhancement, β, enables electron emission by having energy concentrated closely at the antenna/vacuum interface. According to the understanding of the inventors, this confinement eliminates the difference in electric potential energy between the antenna material and vacuum for electrons, and allow the latter to undergo quantum tunnelling (emission) from the antenna to vacuum. This electron emission process is enhanced in a non-linear fashion by having coherent electromagnetic radiation impinging on the antenna. Therefore, the photo-cathode according to the invention is very useful for detection of coherent signals, such as laser signals.

Field enhancement according to the invention may be achieved with a variety of different antenna structures/conducting structures as will be further elaborated below, and may be selected based on the desired property of the photo-cathode. For instance, some structures may provide electron emission over a broad wavelength range of the incoming electromagnetic radiation. Other structures may be designed to provide resonance for a narrow bandwidth application, and thus have a high sensitivity within that narrow band.

In an embodiment of the photo-cathode according to the invention, the tip section is configured to provide the field enhancement β by concentrating the electric field in a volume as expressed by a confinement volume, V, wherein $$\beta \propto \frac{1}{\sqrt{V}},$$

the confinement volume being highly sub-wavelength. The correlation between photon energy h·f and free space electric field $E_{THz}$ for N photons received, may be expressed based on the confinement volume V:

$$\text{Energy(photon)} =$$

$$N\cdot h\cdot f=\frac{1}{2}\cdot\varepsilon_0\cdot(\beta\cdot E_{THz})^2\cdot V\rightarrow\beta=\sqrt{\frac{2\cdot N\cdot h\cdot f}{\epsilon_0\cdot E_{THz}^2}}\cdot\frac{1}{\sqrt{V}}=Const\cdot\frac{1}{\sqrt{V}}$$

where the magnetic and electric contributions are assumed to be equal, as e.g. is the case for light in vacuum. By confining the photon energy to a small volume, the electric field strength increases. Hence, confining the electric field is equivalent to confining the photon energy in its wave form, which in turn affects the electric potential landscape in the confinement volume.

In the context of this invention, it is the tunnel barrier width, which controls an initiation current threshold of the emission. A higher electric field confinement gives a smaller barrier width, even for a constant photon energy. Therefore, the field enhancement β should preferably be maximized to make the tunnel barrier width as small as possible. This may be done by minimizing the effective confinement volume, V.

The part of the electric field, which is not sitting right at the metal/vacuum interface is not relevant.

Now, considering an emitter tip as an emission area, $A_{em}$. The electric field close to the surface bends down the electric potential, thus creating a tunnel barrier with thickness $w_{tu}$. The tunnelling volume is then defined as $V_{tun}=A_{em}*w_{tu}$. Any photon energy sitting outside this volume does not contribute to the tunnelling, but to the increase of ponderomotive energy for emitted electrons.

Now, it is physically impossible to concentrate all incoming energy to the tunnelling volume $V_{tun}$ while ensuring the emitted electrons to enter vacuum and while ensuring a tunnelling barrier thickness of nm-size. However, optimum performance may be achieved by confining the photon field as much as possible in a way that brings as much of the photon energy inside the tunnelling volume as possible. The volume that may be realized in practise is called the confinement volume V. Per definition by the formula given in the text, V is a volume in which the photon electric field is constant everywhere and the integrated electromagnetic energy in the volume equals h*f. This is not equal to the gap volume of the antennas, but the more optimal antennas, the closer it gets. The inventors have shown that for sufficiently small gaps, the first derivative dF/dV behaves according to the formula in the text. It means that a significant portion—but not 100%—of the photon energy sits inside the gap volume.

In an embodiment of the photo-cathode according to the invention, the tip section comprises two electrodes, the two electrodes being separated by a gap, the gap having a gap width.

Having a sufficiently narrow gap helps to confine the field to the tip section, and thereby to minimize V. For large gap values, on the other hand, the field is poorly confined to the gap and mainly spreads out as a fringing field. For gap widths smaller than approximately 4 times the square root of a cross-sectional area of the tip section in the plane perpendicular to the substrate, the field confinement starts to follow the analytical prediction. Thus, the gap width should preferably be selected to be about this value, or smaller.

In an embodiment of the photo-cathode according to the invention, the gap width is in the range of about 1 nm-1000 nm, such as about 10 nm-500 nm, or even about 20 nm-100 nm. A gap width in this range has been found to provide a good confinement of the field.

In an embodiment of the photo-cathode according to the invention, the two electrodes are comprised as a first electrode and a second electrode, and wherein the geometry of the first electrode is selected to provide a first field confinement, and the geometry of the second electrode is selected to provide a second field confinement, the first field confinement being different from the second field confinement. In this way, the structure may be made sensitive to the polarization and absolute field polarity of the received electromagnetic radiation.

In one embodiment of the invention, the first electrode may have the geometry of a straight tip, while the second electrode may have a T-shaped geometry.

In an embodiment of the photo-cathode according to the invention, the photo-cathode is configured for receiving the electromagnetic radiation at a design wavelength, wherein the design wavelength is in the terahertz range or infrared range. In this way, performance of the photo-cathode may be optimized for that particular wavelength.

In an embodiment of the photo-cathode according to the invention, the photo-cathode is configured for receiving the electromagnetic radiation in a broadband design wavelength range, wherein the broadband design wavelength range is in the terahertz range or infrared range. In this way, the photo-cathode may be optimized for broadband use.

In an embodiment of the photo-cathode according to the invention, the conducting structure has a dipole antenna geometry. This type of geometry is particularly well suited for receiving electromagnetic radiation at a resonance wavelength of the antenna.

In an embodiment of the photo-cathode according to the invention, the conducting structure has a split-ring geometry.

In an embodiment of the photo-cathode according to the invention, the split-ring geometry is a double split-ring geometry, comprising two interconnected rings having a common tip section, and a common gap. This type of structure enhances a broader range of wavelengths, and is therefore is well suited for receiving electromagnetic radiation within a broad wavelength band.

In an embodiment of the photo-cathode according to the invention, the conducting structure comprises a conducting material having a high electrical conductivity at infrared wavelength, such as a conductivity in excess of $10^5$ S/m, such as in excess of $5 \cdot 10^5$ S/m, or even in excess of $10^6$ S/m. The conducting structures according to the invention may be fabricated in many different materials, provided that they have a sufficiently large conductivity in the relevant wavelength range.

In one embodiment of the invention, the conducting material comprises a conducting ceramic.

In a particular embodiment of the invention, the conducting ceramic is Titanium Nitride.

In another embodiment to the invention, the conducting material comprises an allotrope of carbon, such as graphene. In an embodiment of the photo-cathode according to the invention, the conducting material comprises a metal. In contrast to conventional photo-cathodes, metal is suitable for fabrication of the conducting structure of the present invention. Metals tends to have relatively constant material parameter throughout the infrared and THz spectral range, which simplifies optimization of the geometry for different wavelengths.

In an embodiment of the photo-cathode according to the invention, metal from the group of copper, gold, Silver, Titanium, Aluminium, and Tungsten. These particular metals have been found to be particularly well suited for producing the photo-cathode.

In an embodiment of the photo-cathode according to the invention, substrate is chosen to have a transmission of the incoming electromagnetic radiation of 10% or higher, such as 30% or higher or even 40% or higher. This enables the conducting structure of the photo-cathode to be back-illuminated, i.e. having the incoming electromagnetic radiation coining through the substrate before interacting with the conducting structure. In this way, the substrate does not interfere with the electron emission from the structure.

In an embodiment of the photo-cathode according to the invention, a plurality of conducting structures are arranged in an array. In this way, the cross-sectional area of the photo-cathode may be increased, while the dimensions of the individual conducting structures may be maintained. Thus, the sensitivity of the photo-cathode may be increased. In an embodiment of the photo-cathode according to the invention, the photo-cathode comprises a meta-material, the meta-material comprising the array of conducting structures, the plurality of conducting structures being arranged on a common substrate.

In an embodiment of the photo-cathode according to the invention, the vacuum system comprises a photo multiplier tube, PMT. In an embodiment of the photo-cathode according to the invention, the vacuum system comprises a multichannel plate. According to a second aspect of the invention, an imaging system is disclosed, comprising the multi-channel plate having a plurality of conducting structures, and a spatially resolved detector system, wherein emission from the conducting structures is spatially mapped onto the spatially resolved detector for generating an image.

BRIEF DESCRIPTION OF DRAWINGS

The photo-cathode. according to the invention will now be described in more detail with regard to the accompanying figures. The figures show one way of implementing the present invention and is not to be construed as being limiting to other possible embodiments falling within the scope of the attached claim set.

DESCRIPTION OF EMBODIMENTS

Figure 1:
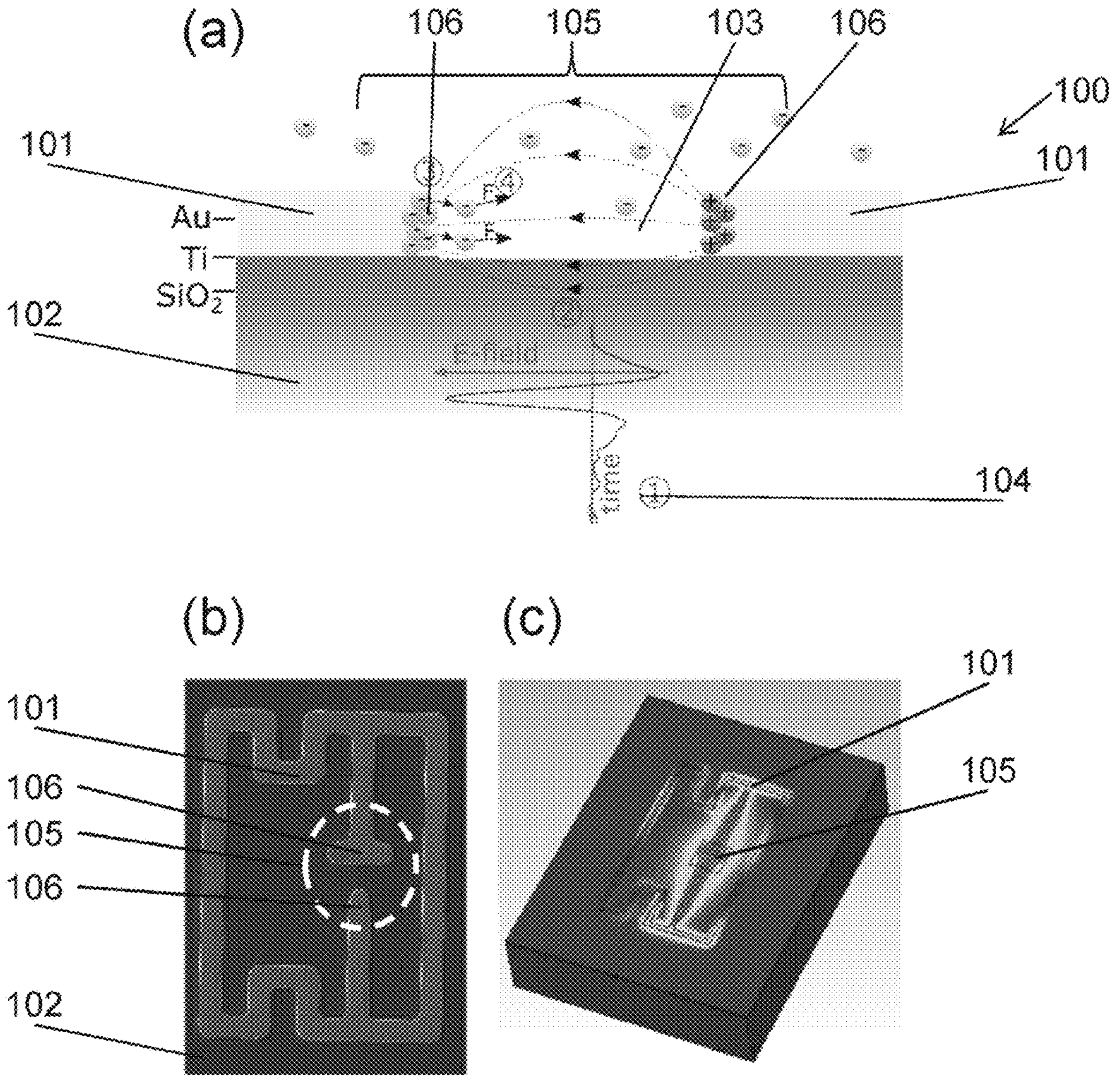
FIG. 1 illustrates aspects of an embodiment of a photo-cathode according to the invention, and simulation results.

FIG. 1(*a*) illustrates a close-up of an embodiment of the photo-cathode 100 according to the invention. The photo-cathode 100 comprises a conducting structure 101 and a substrate 102. The conducting structure 101 (also called "antenna" in the following) is arranged to provide two electrodes 106, separated by a gap 103. Illustrated is the interaction process between the incoming photon electric field 104 and the antenna 101, shown as a close-up at the tip section 105, including the antenna gap 103. The figures show examples of materials that may be used to realize the structure, which materials have been used in the calculations shown here. Other choices of materials may also be envisioned, as discussed elsewhere in this document. An electric field time trace containing a band of frequencies in the terahertz frequency range is illustrated to indicate the received electric field 104 that propagates through the transparent substrate 102. It is noted that the photo-cathode according to the invention is not restricted to work in the terahertz frequency range, but may also be designed to operate at optical wavelengths. The electric field is concentrated in a volume around the gap 103, thus setting up a strong electric field across the tip section 105 of the conducting structure 101, here shown as electrodes 106. The strong electric field enables electrons to undergo tunnelling from the conducting material of the antenna to the surrounding environment. As a last step, the electrons are accelerated in the electric field (4). FIG. 1(*b*) shows a scanning electron micrograph (SEM) of a conducting structure 101, in the form of a double Split Ring Resonator (dSRR) antenna. The dashed circle indicates the tip section 105, comprising the electrodes 106 and gap 103. FIG. 1(*c*) shows finite-element simulation of the electric field in the plane of the antenna (101) at a point in time when the electric field in the tip section 105 is strongest.

Figure 2:
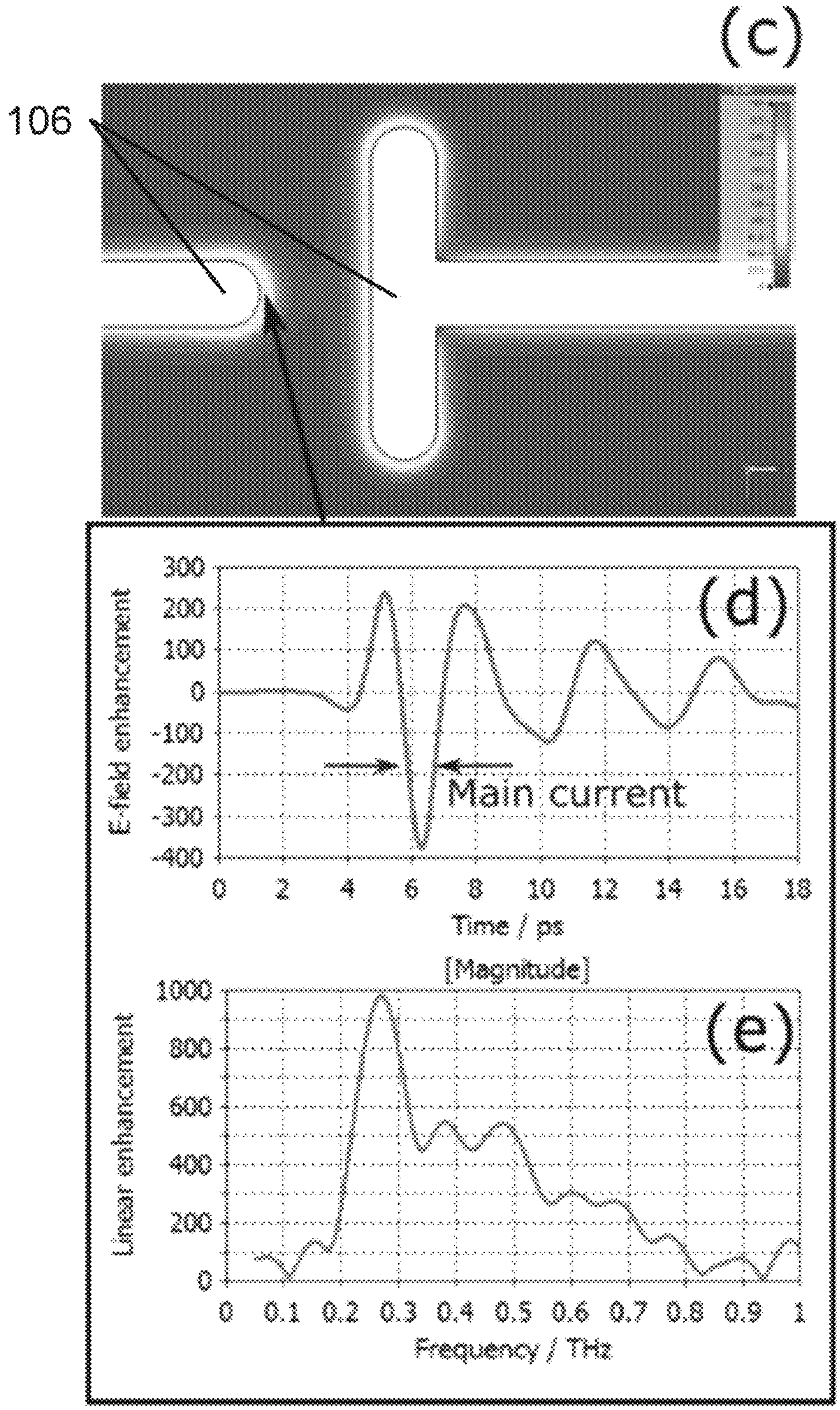
FIG. 2 illustrates aspects of an embodiment of a photo-cathode according to the invention, and simulation results.

FIG. 2(*c*) shows the field from FIGS. 1(*b*) and (*c*) in a close-up at a different color scale. FIG. 2(*d*) shows the electric field in time inside the tunnelling volume, as illustrated by the arrow. The field enhancement reaches close to 400. FIG. 2(*e*) illustrates a frequency content of the time signal in FIG. 2(*d*). It is apparent that the dSRR antenna geometry enhances a broad range of frequencies to obtain a large field enhancement in time for a broadband, incoming electric field signal.

Figure 3:
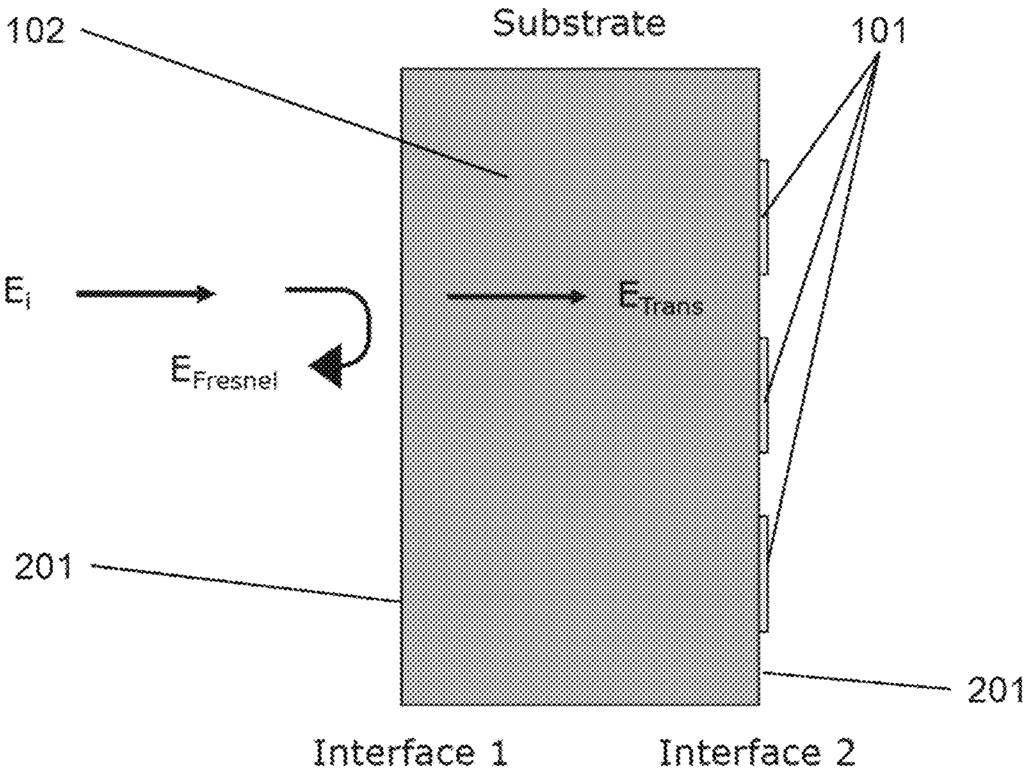
FIG. 3 illustrates an embodiment of a substrate of a photo-cathode according to the invention.

FIG. 3 illustrates an incoming electric field $E_i$, impinging on the substrate 102. Illustrated are the main workings of the substrate along. The main loss of electric field happens at the first interface 201 and is due to Fresnel reflection. The purpose of the substrate 102 is to provide a physical platform for building the photo-cathode. The substrate 102 has no functionality for the field emission process itself. One choice of substrate is HR-Si (High Resistivity Silicon), which is non-absorptive to THz and IR radiation, but has a refractive index of 3.42. Hence, the Fresnel reflection of the electric field at the first interface 201 is 30%. At the second interface 202, the reflection is considered non-important as the light interacts with antennas that are much thinner than the wavelength of the light. However, since the light at the second interface effectively exists partly in the substrate and partly in the vacuum, it experiences an effective, refractive index that should be included when calculating the resonance properties of the antenna.

Figure 4:
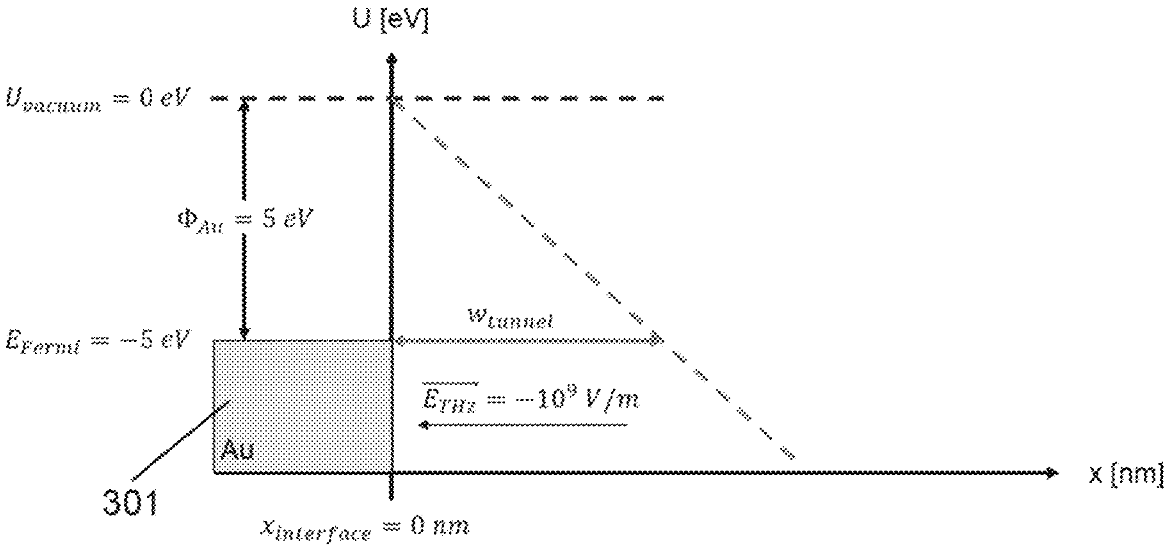
FIG. 4 illustrates an operating principle of the photo-cathode according to the invention.

FIG. 4 illustrates the tunnelling process from an antenna tip with relevant numerical values inserted for illustration. A spatially invariant, electric field points towards the conducting surface, here illustrated with gold 301. The energy difference between the gold Fermi level and the vacuum level is 5 eV. By integrating the electric field in the direction normal to the gold surface, it is possible to find the distance at which the electric potential due to the applied electric field equals that of the gold Fermi level. This distance is what we denote the tunnel barrier width. A typical value is 5 nm or below for a measurable emission level in a vacuum electronic system when considering that the electric field is only present for the duration of the incident signal (typically on the order of 1 ps for broadband transients in the terahertz frequency range).

Example: For a constant electric field of $-10^9$ V/m pointing towards the gold surface, the electric potential energy is given by:

$$U(x) = \int E_{THz}(x)dx = -10^9 \frac{V}{m} \cdot x$$

Hence, the tunnel barrier width $$w_{tunnel} = \frac{\Phi[V]}{E_{THz}\left[\frac{V}{m}\right]} = 5 \text{ nm}.$$

This result presented in point (1) is a well-known result known as the Fowler-Nordheim field emission type. It assumes time independence of the applied electric field.

Figure 5:
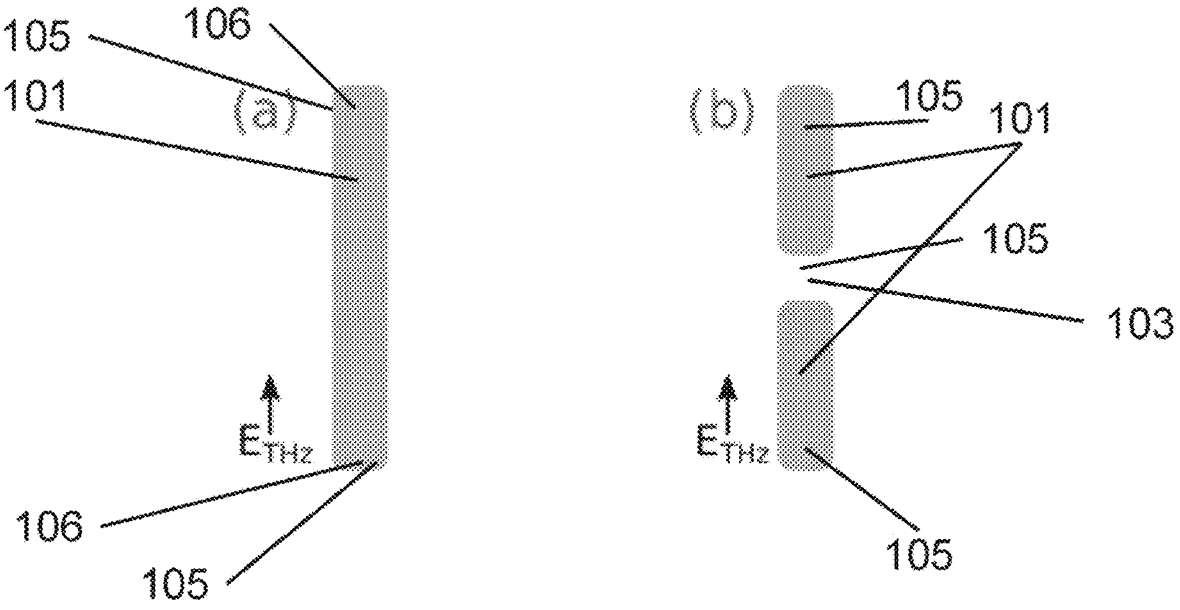
FIG. 5 illustrates another embodiment of the photo-cathode according to the invention.

In the ultrafast field emission scheme, like that of the emission driven by photons, the time-independence is no longer valid. This can be corrected for by assuming a quadratic potential barrier. Here, Φ is the system work function assuming a triangular potential barrier close to the emission surface FIG. 5 illustrates different possible configurations of conducting structures (101), i.e. (a) a single resonant dipole and (b) two dipoles separated by a gap 103. Each pole of a dipole may be seen as an electrode 106, forming part of a tip section 105.

Figure 6:
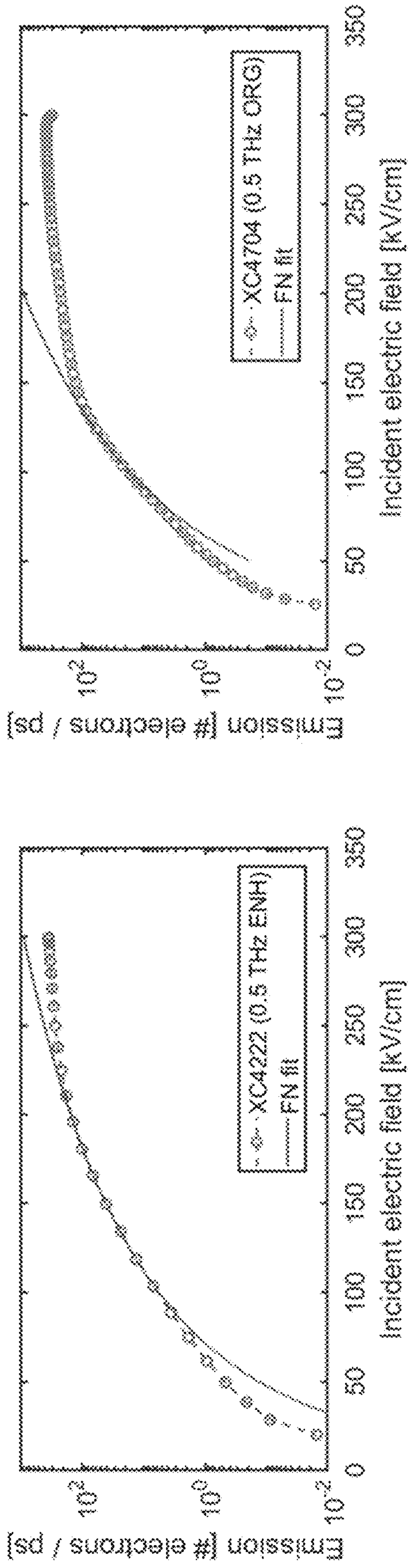
FIG. 6 shows simulation results for examples of a photo-cathode according to the invention.

Documentation of Number of Electrons Emitted as Function of Incident Field Strength:

Due to the Fowler-Nordheim emission physics, the electron emission current is highly nonlinear with respect to the incident field strength. Furthermore, the sharpness of the tip that emits the electrons influences the emission. Both points are illustrated in FIG. 6. The left panel shows the emission current vs incident field strength for a rounded tip (radius of curvature 1.5 μm), and the right panel shows the emission from a similar structure, where the emission tip is pointed, leading to a higher field enhancement. In the latter case, the high-emission range extends to lower incident field strengths. The Fowler-Nordheim fits ("FN fit" curves in each plot) allows the determination of the absolute incident field strength (the x axis of the curves), in close agreement with field strength values determined by calibrated free-space electro-optic sampling of the THz waveform.

Documentation of Emission from Structures of Different Geometry

The geometry of the antenna determines the field enhancement factor and the field confinement. Hence, electron emission is not limited to a specific geometry, as illustrated with comparison of FIG. 6 and FIG. 8. In FIG. 6, the antenna is in the form of an I-structure (FIG. 5(*a*)), and in FIG. 8, the antenna is in the form of a dSRR (FIG. 1(*b*)). Hence, the inventors have realised that many geometries of the antenna can lead to a given field enhancement and localization of the field. A specific geometry can be chosen to emphasize field localization at a small point and minimize electromagnetic coupling between adjacent elements (as embodied in the dSRR), or to allow coupling between adjacent antennas (the I-structure). Certainly, a plurality of other geometries will show similar features.

Documentation of Measurement of Absolute Polarity

Figure 7:
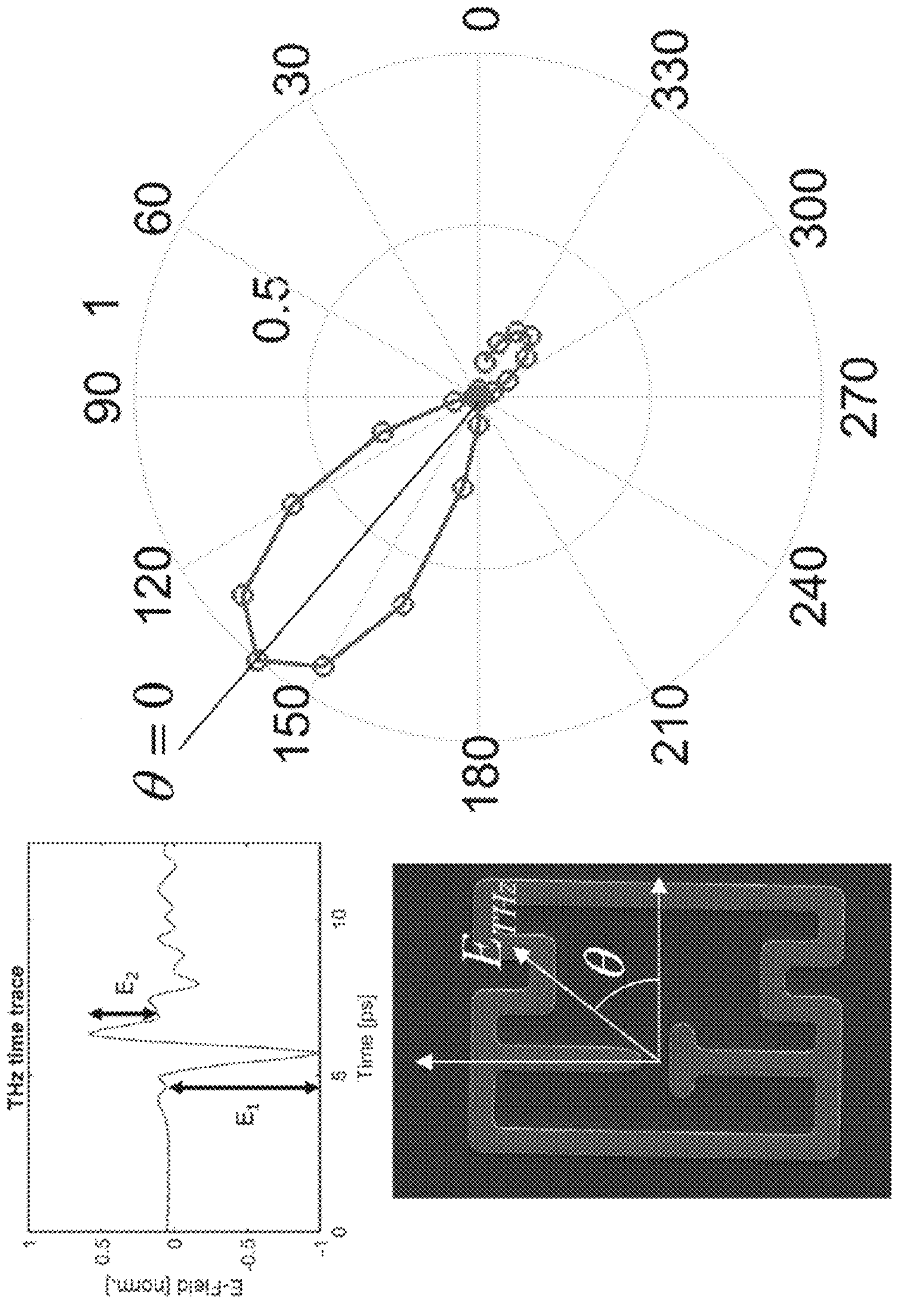
FIG. 7 shows simulation results for another embodiment of the photo-cathode according to the invention.

The electron emission is only efficient if a tunnelling channel is opened from the metal into the surrounding medium. This is ensured by a polarity of the driving electric field towards the tip. Thus, a reversal of the field direction at a constant field strength will diminish the electron emission efficiency drastically. This implies that an asymmetric dSRR design will be able to detect the absolute polarity of the driving THz field. As illustrated in FIG. 7, this capacity enables detection of the absolute polarity of asymmetric driving fields. As is shown in the figure, the incident THz field can be in the form of an asymmetric single cycle (top left corner), where the degree of asymmetry can be defined as the $1-|E_2/E_1|$. If the polarity of this input field is rotated with respect to the orientation of the dSRR antenna (lower right panel), the emission current varies with the incidence angle as shown in the left part of the figure. A very clear anisotropy in the emission current is observed, and the absolute polarity of the field can be determined.

Figure 8:
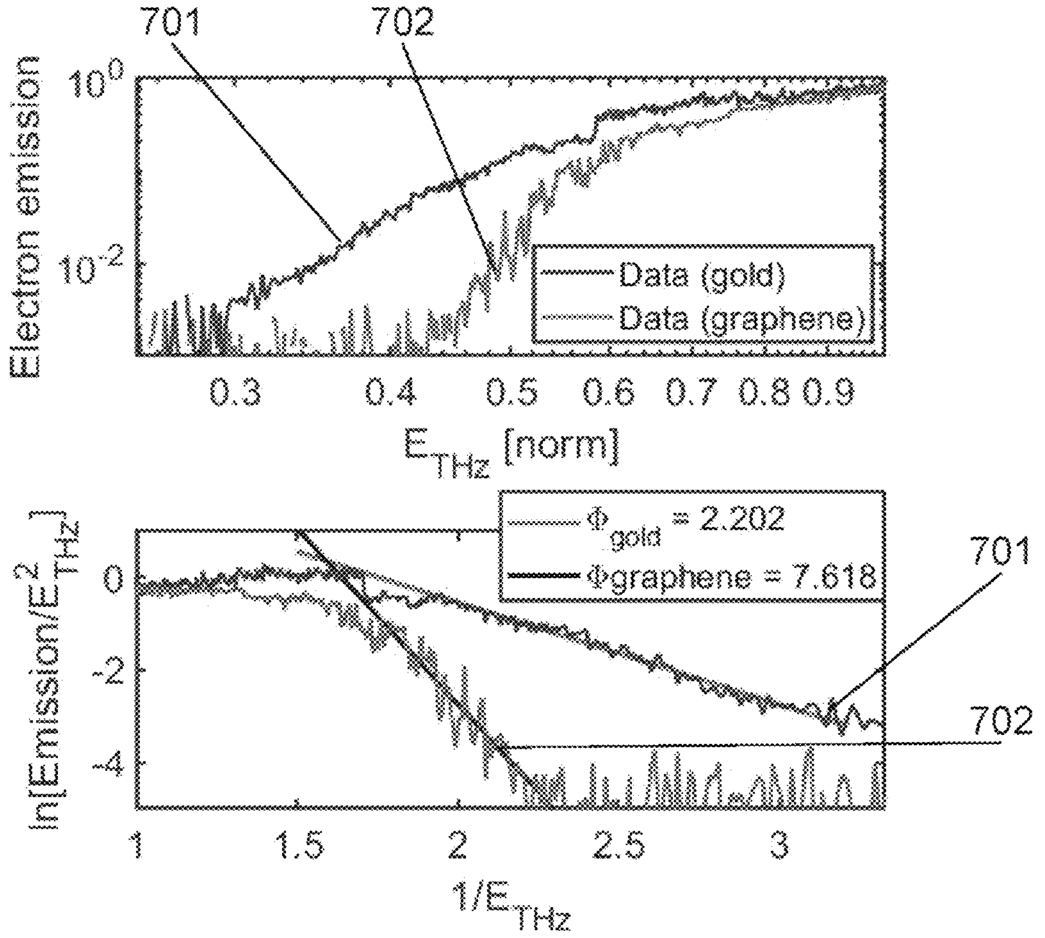
FIG. 8 shows simulation results for different choices of conducting materials for the conducting structure of the photo-cathode.

FIG. 8 shows the electron emission from simple dipole antennas (I-structures as shown in FIG. 5(*a*)) as function of incident electric field strength. Emission from antennas made of gold 701 and antennas made of graphene 702 is shown. The Fowler-Nordheim plots (lower panel) determines the effective work function of each material. For gold, a work function lower than that of bulk gold is found, as observed in many previous studies. For graphene, the extracted work function matches closely that of the armchair configuration.

Documentation of Arrangement in Array and its use for Imaging of THz Beams

Figure 9:
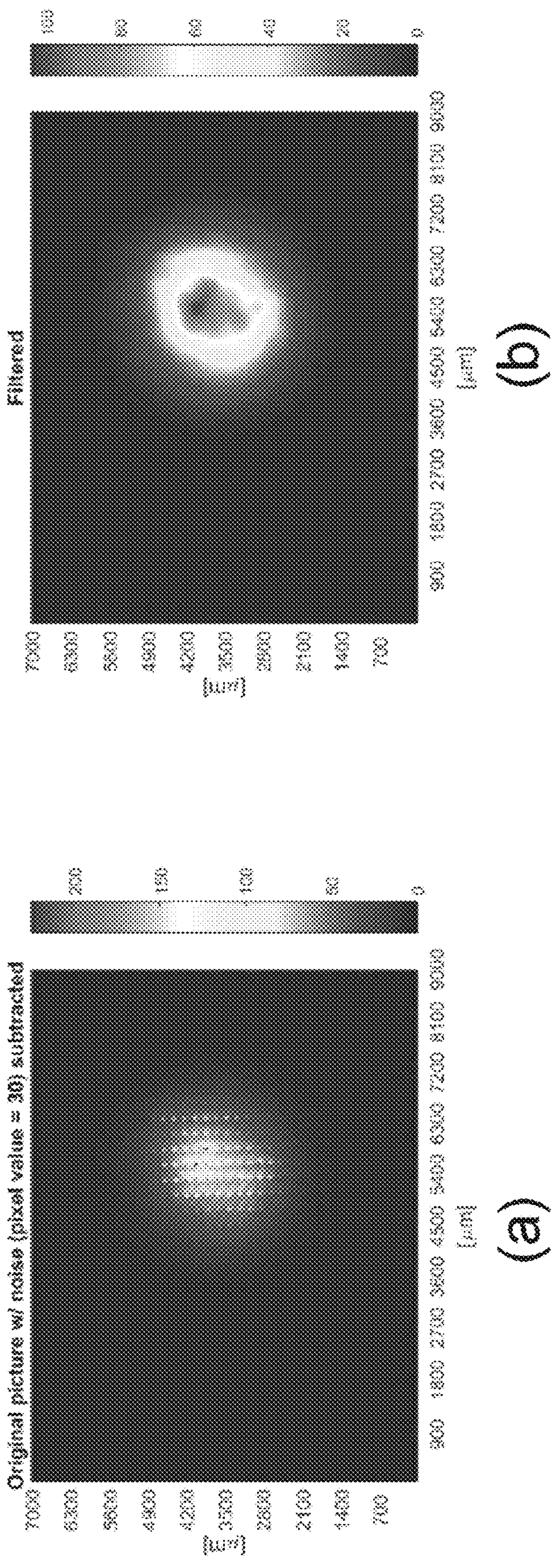
FIG. 9 shows simulation results corresponding to the imaging system according to the second aspect of the invention.

If the individual antennas are placed in an array, and if the meta-material (i.e. collection of antennas) is read off from each individual antenna, an image can be formed. This is illustrated in FIG. 9. In this example the meta-surface with the antenna array is placed in an argon atmosphere, where the emitted electrons can collide with the argon atoms. The collision delivers energy to the argon atoms, which are excited to a higher electronic state. Subsequent relaxation to the ground state leads to emission of visible light akin to a glow discharge. To form such image, a closed antenna design is preferable to avoid field coupling between antennas, which will make it hard to interpret the emission from a single antenna as a representation of the peak field at that exact point only. The dSRR is a design that solves the problem of field encapsulation well (FIG. 9(*b*)). The image formation can be done in vacuum with e.g. a multi-channel plate instead of a gas. This will decrease the detection threshold and thus increase the image formation sensitivity. The image formation can commonly be done for all antenna types.

Due to the engineered periodicity of the antenna array, any pixelated image can effectively be reconstructed using 2D FFT filtering, as shown in FIG. 9(*b*).

Documentation of the Lighting Rod Effect (Mid-IR Driven Emission)

In addition to the resonant field enhancement, another physical effect, the so-called lightning rod effect, influences the emission process. This effect enhances the field confinement at the tip as $a^2$, where a is the tip radius.

As an example, consider two tips of 1500 nm and 150 nm radius, respectively, illuminated with 3.2 um light. The illuminated antennas have no resonance enhancement for this frequency, and enhancement thus only relies on the lightning rod effect. The lightning rod enhancement for a 10-fold decrement in a (leading to a tip radius decrease of a factor of 10) should theoretically be $a^2$=100.

Figure 10:
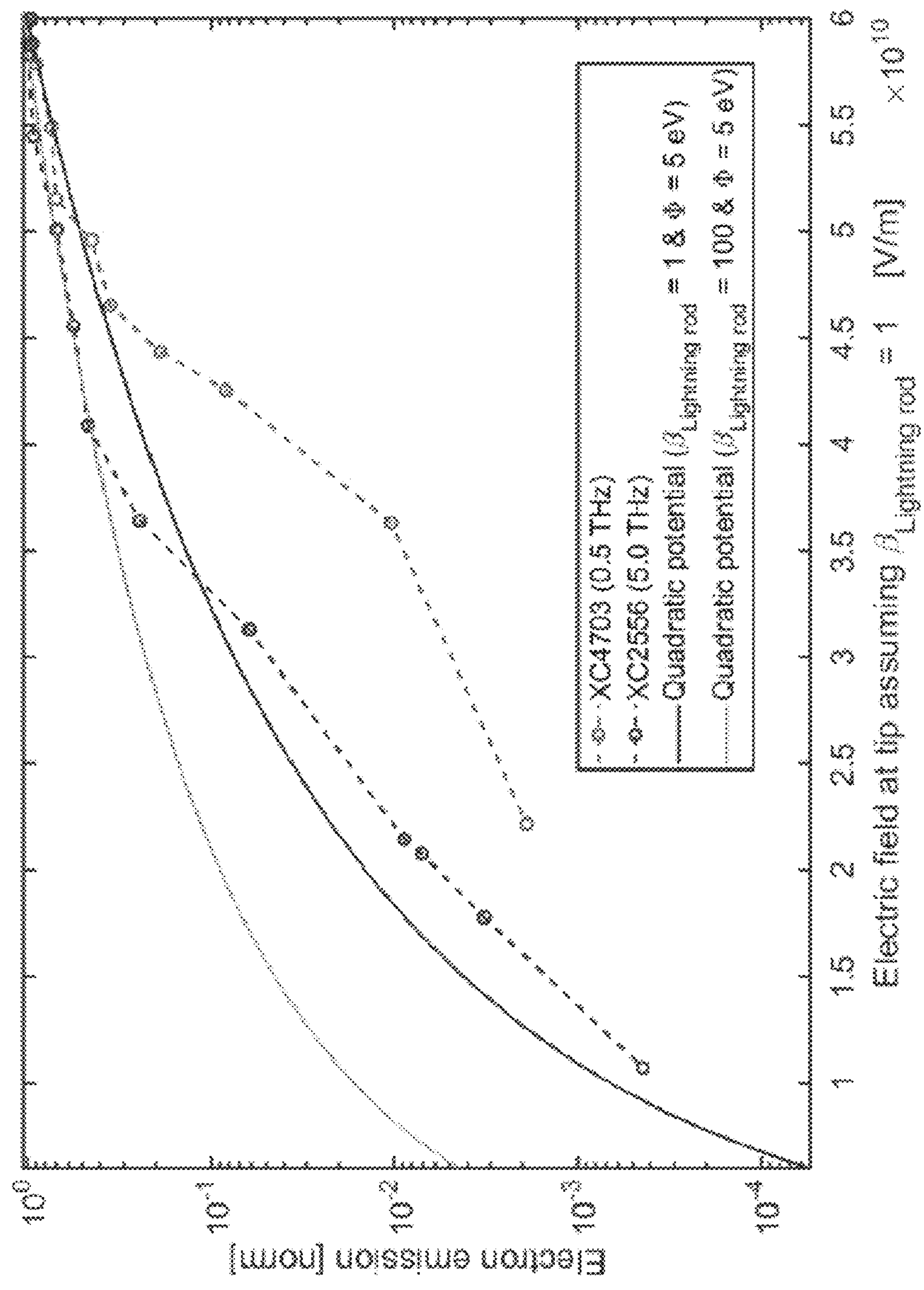
FIG. 10 shows simulation results relating to operation of embodiments of the invention.

The resulting field-dependent emission currents are fitted with the Fowler-Nordheim emission model with quadratic potential and relative field enhancement fraction of 100. The agreement is good, as shown in FIG. 10.

Figure 11:
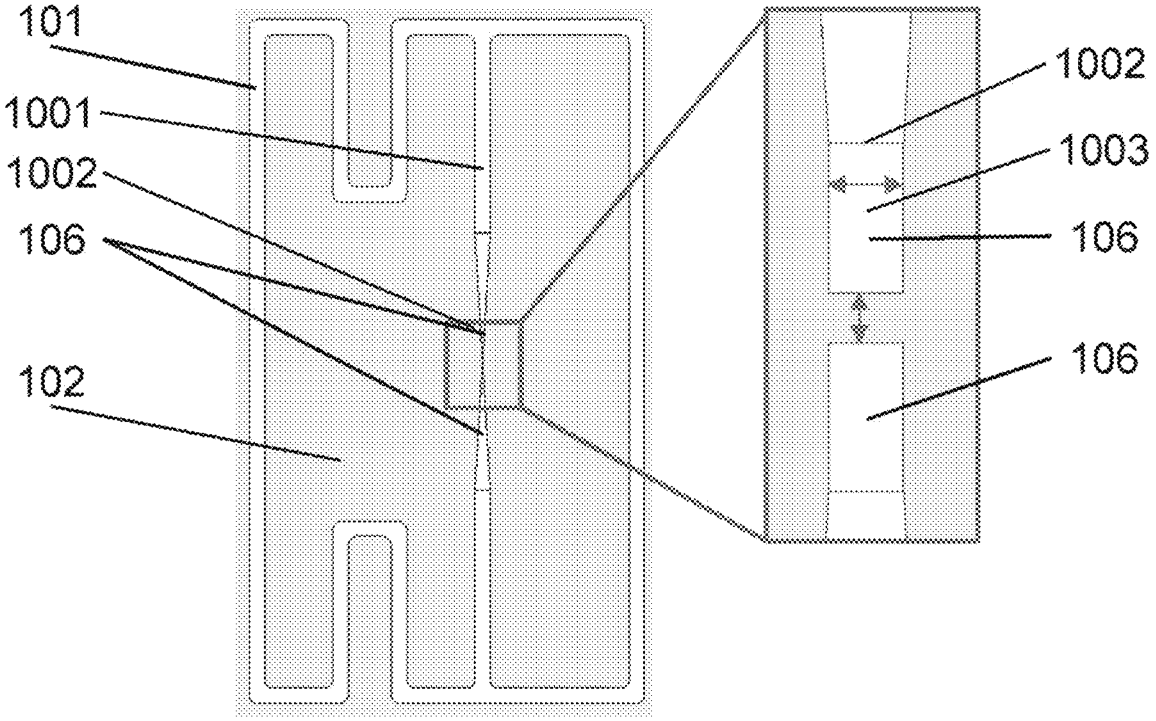
FIG. 11 shows an embodiment of the invention.

Hence, for all applications, a core feature of the antennas is to have as sharp or pointy a geometry of the tip section as possible to maximize field confinement. This will enhance both resonantly driven electron emission and emission due to the lightning rod effect. In this context, a sharp electrode is one that includes a taper (see FIG. 11), which starts at an antenna line width 1001 and ends with significantly smaller dimensions 1002 in the plane parallel to a substrate surface, preferably as small as possible. It is noted that the taper does not need to be continuous, in that the tip may comprise a non-tapered part 1003 at the narrow end of the taper, e.g. towards the gap. In practice, the minimum dimensions obtainable is limited by fabrication technology. A typical antenna line width is several hundred nanometers, even up to several micrometers. A typical tip dimension is 20 nm or even 10 nm. In the direction perpendicular to the substrate surface, i.e. the "antenna thickness", an optimal thickness may be found as a trade-off between a large thickness, which supports low electrical resistance in the antenna and hence optimal use of electrical conductivity, and small thickness, which supports the smallest possible tip cross-sectional area.

Figure 12:
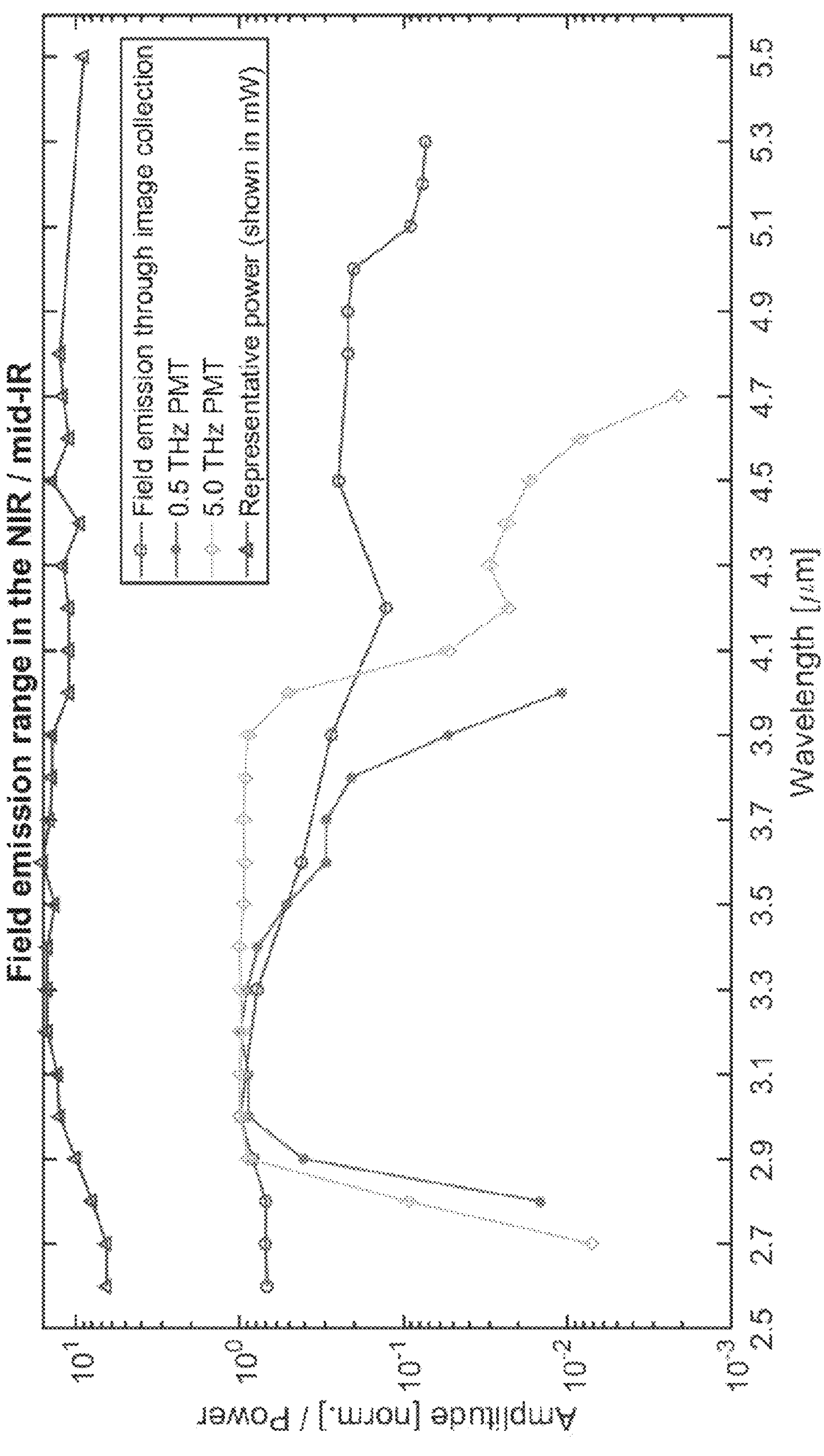
FIG. 12 shows simulation results relating to a spectral response of embodiments of the photo-cathode according to the invention.

The practical use of the lightning rod effect is shown in FIG. 12, where emission driven by mid-infrared wavelengths (2.5-5.5 μm wavelength) is exemplified. The average power of a femtosecond mid-IR source is shown as a substantially constant curve at the top of the plot. The curves labeled "0.5 THz PMT" and "5.0 THz PMT" are electron emission signals detected with antenna structures with a=1500 nm and a=150 nm, respectively. The mid-IR light source is passed through a fused silica window before reaching the antennas. Fused silica is known to have a strong absorption band at wavelengths longer than 3.9 μm. Hence, the increased electron emission by two orders of magnitude at 4.0 μm excitation wavelength observed for the 150-nm tip radius (one order of magnitude smaller) is in agreement with the field confinement increase that scales as $a^2$, and evidence that the lightning rod effect is beneficial for efficient electron emission driven by mid-IR light sources.

Figure 13:
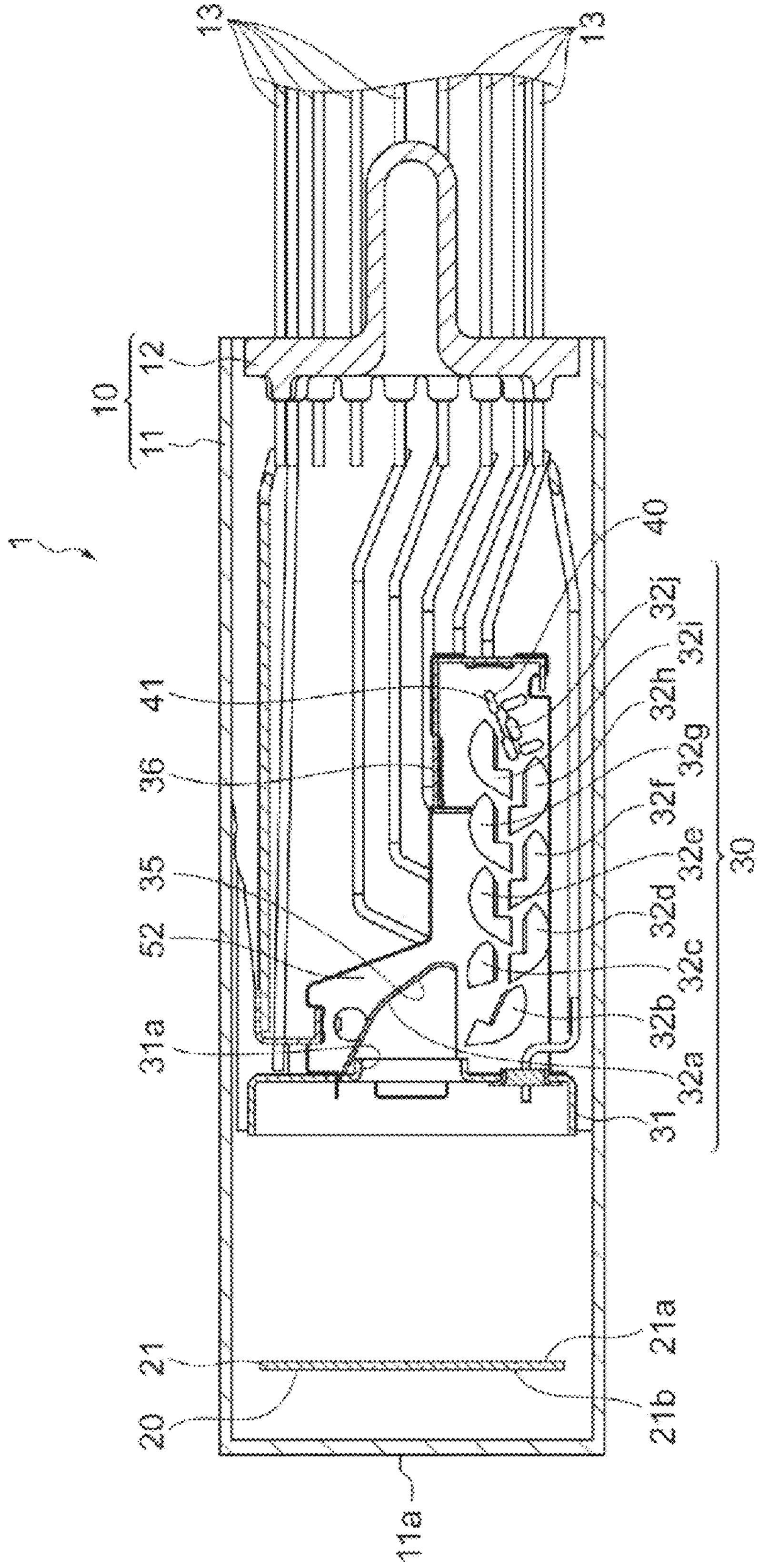
FIG. 13 illustrates a photo-multiplier tube useful in connection with the present invention.

FIG. 13 is a cross-sectional view illustrating an example of an electron tube. An electron tube 1 is a photomultiplier tube that outputs an electric signal in response to incidence of an electromagnetic wave. When the electromagnetic wave is incident, the electron tube 1 internally emits electron and multiplies the emitted electron. In the present specification, the "electromagnetic wave" incident on the electron tube is an electromagnetic wave included in a frequency band from a so-called millimeter wave to infrared light. As illustrated in FIG. 13, the electron tube 1 includes a housing 10, an electron emitting unit (photo-cathode) 20, an electron multiplying unit 30, and an electron collecting unit 40.

The housing 10 includes a valve 11 and a stein 12. An inner portion of the housing 10 is airtightly sealed with the valve 11 and the stein 12 and is held in a vacuum. The vacuum includes not only an absolute vacuum but also a state where the housing is filled with gas having a pressure lower than an atmospheric pressure. For example, the inner portion of the housing 10 is held at $1\times10^{-4}$ to $1\times10^{-7}$ Pa. The valve 11 includes a window 11*a* that transmits the electromagnetic wave. The housing 10 has a cylindrical shape, for example. In the embodiment, the housing 10 has a circular cylindrical shape. The stein 12 configures a bottom surface of the housing 10. The valve 11 configures a side surface of the housing 10 and a bottom surface facing the stein 12.

The window 11*a* configures a bottom surface facing the stein 12. For example, the window 11*a* has a circular shape in plan view. The window 11*a* includes at least one selected from quartz, silicon, germanium, sapphire, zinc selenide, zinc sulfide, magnesium fluoride, lithium fluoride, barium fluoride, calcium fluoride, magnesium oxide, and calcium carbonate. In the embodiment, the window 11*a* is made of quartz. A frequency characteristic of transmittance of the electromagnetic wave is different depending on a material. Therefore, a material of the window 11*a* may be selected depending on a frequency band of the electromagnetic wave passing through the window 11*a*. For example, the quartz may be selected as a material of a member transmitting an electromagnetic wave having a frequency band of 0.1 to 5 THz, the silicon may be selected for a material of a member transmitting an electromagnetic wave having a frequency band of 0.04 to 11 THz and 46 THz or more, the magnesium fluoride may be selected for a material of a member transmitting an electromagnetic wave having a frequency band of 40 THz or more, the germanium may be selected for a material of a member transmitting an electromagnetic wave having a frequency band of 13 THz or more, and the zinc selenide may be selected for a material of a member transmitting an electromagnetic wave having a frequency band of 14 THz or more.

The electron tube 1 includes a plurality of wires 13 for enabling electrical connection between an outer portion and an inner portion of the housing 10. The plurality of wires 13 are, for example, lead wires or pins. In the embodiment, the plurality of wires 13 are pins penetrating the stein 12 and extend from the inner portion of the housing 10 to the outer portion thereof. At least one of the plurality of wires 13 is connected to various members provided in the inner portion of the housing 10.

The electron emitting unit 20 is disposed in the housing 10 and emits electron in response to the incidence of the electromagnetic wave in the housing 10. The electron emitting unit 20 includes a meta-surface 50 and a substrate 21 provided with the meta-surface 50. The substrate 21 has transparency for the electromagnetic wave passing through the window 11*a*. In the present specification, the "transparency" means a property of transmitting at least a partial frequency band of the incident electromagnetic wave. That is, the substrate 21 transmits at least a partial frequency band of the electromagnetic wave passed through the window 11*a*. The substrate 21 is made of, for example, silicon. The substrate 21 has a rectangular shape in plan view. The substrate 21 is separated from the window 11*a* and the electron multiplying unit 30.

Figure 14:
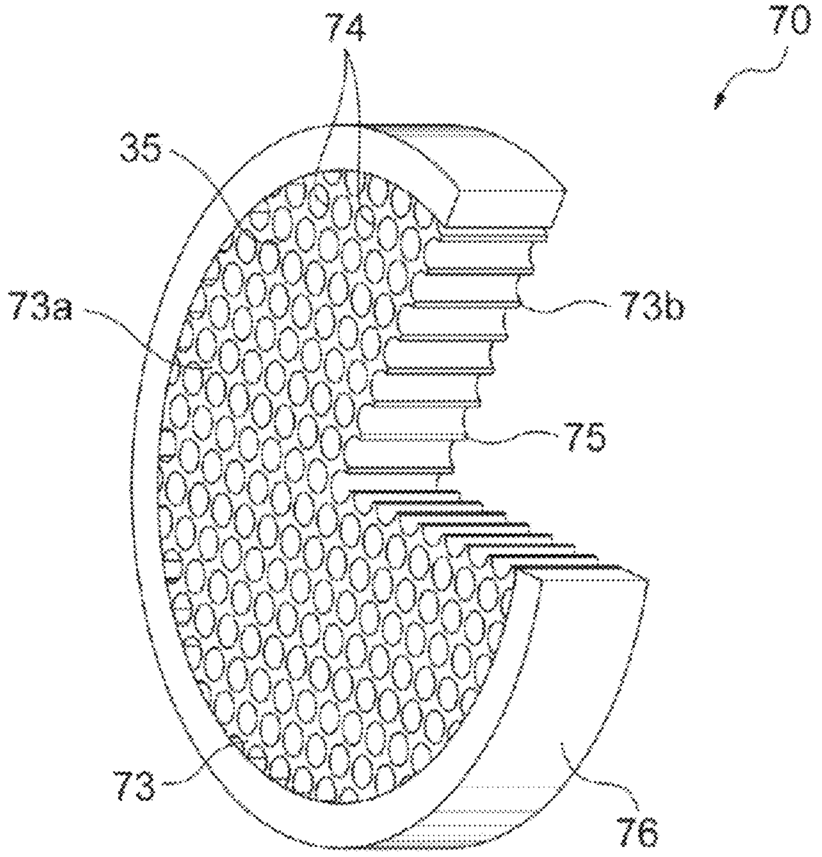
FIG. 14 shows a multi-channel plate useful in connection with the present invention.

FIG. 14 is a perspective cutaway view of an example of the microchannel plate (multi-channel plate). In this modification, the microchannel plate 70 includes a base body 73, a plurality of channels 74, a partition wall portion 75, and a frame member 76, as illustrated in the figure. The base body 73 includes an input surface 73*a* and an output surface 73*b* opposite to the input surface 73*a*. The base body 73 is formed in a disk shape. The input surface 73*a* faces the substrate 21. The output surface 73*b* faces the anode 41. The input surface 73*a* and the output surface 73*b* are disposed in parallel to the window 11*a*, the substrate 21, and the meta-surface 50. The anode 41 has a flat plate shape and is disposed in parallel to the output surface 73*b* of the microchannel plate 70.

The plurality of channels 74 are formed in the base body 73 from the input surface 73*a* to the output surface 73*b*. Specifically, each channel 74 extends from the input surface 73*a* to the output surface 73*b*, in a direction orthogonal to the input surface 73*a* and the output surface 73*b*. The plurality of channels 74 are disposed in a matrix shape in plan view. Each channel 74 has a circular cross-sectional shape. Between the plurality of channels 74, the partition wall portion 75 is provided. To function as an electron multiplier, the microchannel plate 70 includes a resistance layer and an electron emitting layer not illustrated in the drawings, on a surface of the partition wall portion 75 in the channels 74. The frame member 76 is provided on peripheral edge portions of the input surface 73*a* and output surface 73*b* of the base body 73.

In the electron tube 1E, one of the plurality of wires 13 is connected to each of the attachment members 71 and 72. In the microchannel plate 70, a voltage is applied between the input surface 73*a* and the output surface 73*b* through the wire 13 and the attachment members 71 and 72. When the electron emitted from the meta-surface 50 is incident on the input surface 73*a*, the electron is multiplied by the channels 74 and are emitted from the output surface 73*b*. The electrons multiplied by the microchannel plate 70 are collected by the anode 41, and are output as output signals from the anode 41 through the wire 13.

Figure 15:
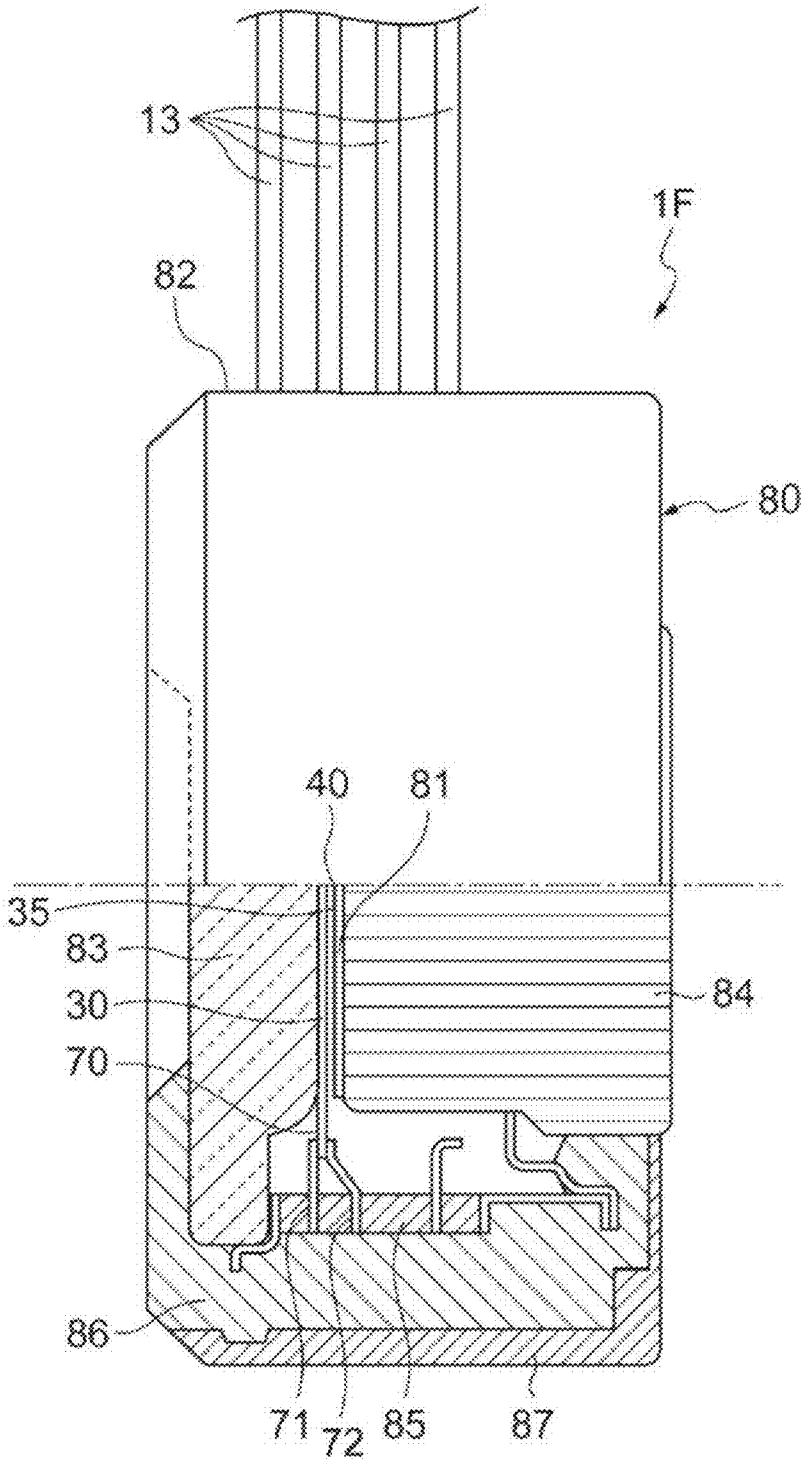
FIG. 15 illustrates an imaging system according to the invention.
Figure 16:
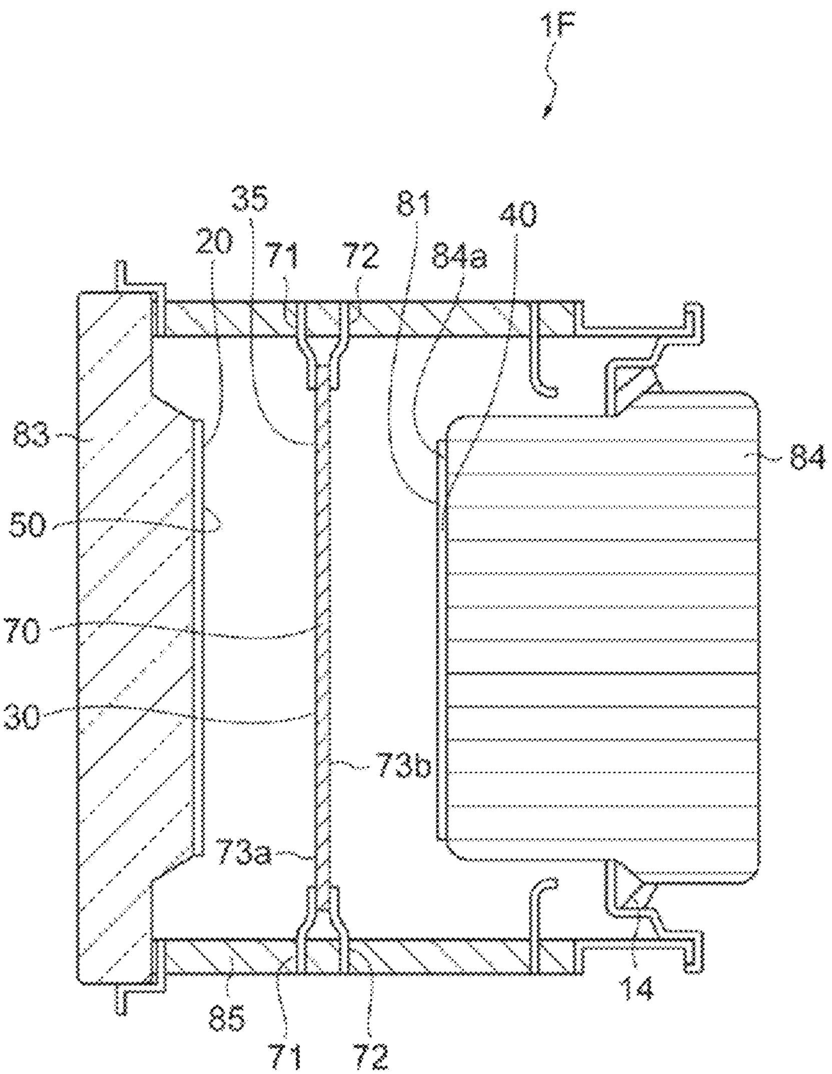
FIG. 16 illustrates an imaging system according to the invention.

Next, an electron tube according to a modification of the embodiment will be described with reference to FIGS. 15 and 16. FIG. 15 is a partial cross-sectional view illustrating an example of the electron tube. FIG. 16 is a cross-sectional view illustrating a part of the electron tube illustrated in FIG. 15. The modification illustrated in FIGS. 15 and 16 is generally similar to or the same as the embodiment described above. However, the modification is different from the embodiment in that the electron tube is a so-called image intensifier. Hereinafter, a difference between the embodiment and the modification will be mainly described.

In an electron tube 1F illustrated in FIG. 15, the electron emitting unit 20, the electron multiplying unit 30, and the electron collecting unit 40 are disposed in a housing 80. The electron multiplying unit 30 includes the microchannel plate 70 instead of the focusing electrode 31 and the dynodes 32*a* to 32*j*. In the electron tube 1F, the electron collecting unit 40 includes a fluorescent body 81 instead of the anode 41. In the electron tube 1F, the meta-surface 50, the microchannel plate 70, and the fluorescent body 81 are close to each other in the housing 80.

The housing 80 includes a sidewall 82, an incidence window 83 (window 11*a*), and an emission window 84. The sidewall 82 has a hollow cylindrical shape. Each of the incidence window 83 and the emission window 84 has a disk shape. An inner portion of the housing 80 is held in a vacuum by airtightly sealing both ends of the sidewall 82 with the incidence window 83 and the emission window 84. For example, the inner portion of the housing 80 is held at $1\times10^{-5}$ to $1\times10^{-7}$ Pa.

The sidewall 82 includes a side tube 85, a mold member 86 covering a side portion of the side tube 85, and a case member 87 covering a side portion and a bottom portion of the mold member 86, for example. Each of the side tube 85, the mold member 86, and the case member 87 has a hollow cylindrical shape. The side tube 85 is made of, for example, ceramic. The mold member 86 is made of, for example, silicone rubber. The case member 87 is made of, for example, ceramic.

A through-hole is formed in each of both ends of the mold member 86. One end of the case member 87 is opened. The other end of the case member 87 is provided with a through-hole. The through hole of the case member 87 includes an edge located to coincide with an edge position of one through-hole of the mold member 86. At one end of the mold member 86, the incidence window 83 is joined to a surface around the through-hole of the mold member 86. Similar to the window 11*a* of the electron tube 1, the incidence window 83 transmits an electromagnetic wave. Similar to the window 11*a* of the electron tube 1, the incidence window 83 includes at least one selected from quartz, silicon, germanium, sapphire, zinc selenide, zinc sulfide, magnesium fluoride, lithium fluoride, barium fluoride, calcium fluoride, magnesium oxide, and calcium carbonate.

In the electron tube 1F, the meta-surface 50 is provided directly on the incidence window 83 in the housing 80. The meta-surface 50 faces the microchannel plate 70. The microchannel plate 70 is disposed between the meta-surface 50 and the fluorescent body 81. The microchannel plate 70 is separated from the meta-surface 50 and the fluorescent body 81.

At the other end side of the mold member 86, the emission window 84 is fitted into the other through-hole of the mold member 86. The emission window 84 is, for example, a fiber plate configured by gathering a large number of optical fibers in a plate shape. Each optical fiber of the fiber plate is configured such that an end surface 84*a* of the inner side of the housing 80 flushes with each optical fiber. The end surface 84*a* is disposed in parallel to the meta-surface 50.

The fluorescent body 81 is disposed on the end face 84*a*. The fluorescent body 81 is formed by applying a fluorescent material to the end face 84*a*, for example. The fluorescent material is, for example, (ZnCd)S:Ag (zinc sulfide cadmium doped with silver). On the surface of the fluorescent body 81, a metal back layer and a low electron reflectance layer are sequentially stacked. For example, the metal back layer is formed by evaporation of Al, has relatively high reflectance for light passed through the microchannel plate 70, and has relatively high transmittance for the electrons emitted from the microchannel plate 70. The low electron reflectance layer is formed by evaporation of, for example, C (carbon), Be (beryllium), or the like, and has relatively low reflectance for the electrons emitted from the microchannel plate 70.

Similar to the electron tube 1E, in the electron tube 1F, one of the plurality of wires 13 extending to the outside of the housing 80 is connected to each of the attachment members 71 and 72 holding the microchannel plate 70. In the microchannel plate 70, a voltage is applied between the side of the input surface 73*a* and the side of the output surface 73*b* through the attachment members 71 and 72.

When the electron emitted from the meta-surface 50 is incident on the input surface 73*a*, the electron is multiplied by the channels 74 and are emitted from the output surface 73*b*. In the electron tube 1F, the electrons multiplied by the microchannel plate 70 are collected in the fluorescent body 81. The fluorescent body 81 receives the electrons multiplied by the microchannel plate 70 and emits light. The light emitted from the fluorescent body 81 passes through the fiber plate and is emitted from the emission window 84 to the outside of the housing 80.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. Photo-cathode for a vacuum system, wherein the photo-cathode is configured for receiving electromagnetic radiation having an incoming wavelength and for emitting electrons in response thereto, the photo-cathode comprising:

a conducting structure having a geometry, the geometry comprising a tip section, wherein the tip section is adapted to provide a field enhancement factor, β, greater than about $10^2$, and a substrate, the substrate being or comprising a dielectric substrate, the substrate supporting the conducting structure, wherein the conducting structure has two dipoles separated by a gap.

2. The photo-cathode according to claim 1, wherein the tip section is configured to provide the field enhancement factor β corresponding to a confinement volume, V, wherein $$\beta \propto \frac{1}{\sqrt{V}},$$

he confinement volume being sub-wavelength.

3. The photo-cathode according to claim 1, wherein the the two dipoles comprise two electrodes, the two electrodes being separated by the gap, the gap having a gap width.

4. The photo-cathode according to claim 3, wherein the gap width is in the range of about 1 nm-1000 nm.

5. The photo-cathode according to claim 3, wherein the two electrodes are comprised as a first electrode and a second electrode, and wherein the geometry of the first electrode is selected to provide a first field confinement, and the geometry of the second electrode is selected to provide a second field confinement, the first field confinement being different from the second field confinement.

6. The photo-cathode according to claim 1, wherein the photo-cathode is configured for receiving the electromagnetic radiation at a design wavelength, wherein the design wavelength is in the terahertz range or infrared range.

7. The photo-cathode according to claim 1, wherein the photo-cathode is configured for receiving the electromagnetic radiation in a broadband design wavelength range, wherein the broadband design wavelength range is in the terahertz range or infrared range.

8. The photo-cathode according to claim 1, wherein the conducting structure has a dipole antenna geometry.

9. The photo-cathode according to claim 8, wherein the conducting structure has a double split-ring geometry, comprising two interconnected rings having a common tip section, and a common gap.

10. The photo-cathode according to claim 1, wherein the conducting structure comprises a conducting material having an electrical conductivity at infrared wavelength, the electrical conductivity being in excess of $10^5$ S/m.

11. The photo-cathode according to claim 10, wherein the conducting material comprises a metal.

12. The photo-cathode according to claim 11, wherein the metal is selected from the group of copper, gold, Silver, Titanium, Aluminium, and Tungsten.

13. The photo-cathode according to claim 1, wherein substrate is chosen to have a transmission of the incoming electromagnetic radiation of 10% or higher.

14. The photo-cathode according to claim 1, wherein a plurality of conducting structures are arranged in an array.

15. The photo-cathode according to claim 14, wherein the photo-cathode comprises a meta-material, the meta-material comprising the array of conducting structures, the plurality of conducting structures being arranged on a common substrate.

16. A vacuum system comprising: a photo multiplier tube comprising the photo-cathode according to claim 1.

17. A multi-channel plate comprising a photo-cathode according to claim 1.

18. An imaging system comprising the multi-channel plate of claim 17 having a plurality of conducting structures, and a spatially resolved detector system, wherein emission from the conducting structures is spatially mapped onto the spatially resolved detector for generating an image.

* * * * *